(12) United States Patent
Hintzer et al.

(10) Patent No.: US 7,018,541 B2
(45) Date of Patent: Mar. 28, 2006

(54) REMOVAL OF FLUORINATED SURFACTANTS FROM WASTE WATER

(75) Inventors: Klaus Hintzer, Kastl (DE); Egon Obermaier, Taubenbach (DE); Werner Schwertfeger, Altoetting (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/034,188

(22) Filed: Jan. 12, 2005

(65) Prior Publication Data

US 2005/0173347 A1    Aug. 11, 2005

(51) Int. Cl.
*B01D 15/04*    (2006.01)
*C02F 1/28*    (2006.01)

(52) U.S. Cl. ............. 210/664; 210/670; 210/694; 210/749; 210/910; 210/915

(58) Field of Classification Search ............. 210/910, 210/915, 749, 664, 670, 694
See application file for complete search history.

(56) References Cited

U.S. PATENT DOCUMENTS

| | | | |
|---|---|---|---|
| 4,005,137 A | 1/1977 | Rudolph et al. | |
| 5,229,480 A | 7/1993 | Uschold | |
| 5,442,097 A | 8/1995 | Obermeier et al. | |
| 5,688,884 A | 11/1997 | Baker et al. | |
| 5,700,859 A | 12/1997 | Ogura et al. | |
| 5,763,552 A | 6/1998 | Feiring et al. | |
| 5,804,650 A | 9/1998 | Tsuda et al. | |
| 5,895,799 A | 4/1999 | Wu et al. | |
| 6,025,307 A | 2/2000 | Chittofrati et al. | |
| 6,103,843 A | 8/2000 | Abusleme et al. | |
| 6,126,849 A | 10/2000 | Yamana et al. | |
| 6,375,837 B1 * | 4/2002 | Yamasaki et al. | ......... 210/143 |
| 6,518,442 B1 | 2/2003 | Felix et al. | |
| 6,613,941 B1 | 9/2003 | Felix et al. | |
| 6,642,307 B1 | 11/2003 | Sogabe et al. | |
| 6,833,403 B1 | 12/2004 | Blädel et al. | |

FOREIGN PATENT DOCUMENTS

| | | |
|---|---|---|
| EP | 0 194 691 A2 | 9/1986 |
| EP | 0 194 692 A2 | 9/1986 |
| EP | 0 712 882 A1 | 5/1996 |
| EP | 0 752 432 A2 | 1/1997 |
| EP | 0 816 397 A1 | 1/1998 |
| EP | 1 059 342 A1 | 12/2000 |
| WO | WO 00/71590 A1 | 11/2000 |
| WO | WO 03/099879 A1 | 12/2000 |

OTHER PUBLICATIONS

*Journal of Fluorine Chemistry*, Elsevier Sequoiz, Lausanne, CH, "Fluorinated Surfactants: synthesis, properties, effluent treatment", M. Pabon, et al; vol. 114, No. 2, Apr. 28, 2002, pp. 149-156.

Database Chemabs 'Online'; Chemical Abstracts Service, Columbus, Ohio, US; Bustrov, G.A. et al; "Final treatment of wastewaters containing perfluoro acids by adsorption on activated carbon"; XP002288162, retrieved from STN Database accession No. 113:11571, Abstract, *Plasticheskie Massy*, (4), 75-8 Coden:Plmsai; ISSN: 0554-2901, (1990).

* cited by examiner

*Primary Examiner*—Chester T. Barry
(74) *Attorney, Agent, or Firm*—Brian E. Szymanski

(57) ABSTRACT

The present invention provides a method of removing a fluorinated surfactant from waste water comprising fluoropolymer particles. The method comprises (i) adding a non-fluorinated surfactant to the waste water (ii) contacting the thus obtained waste water with adsorbent particles to adsorb at least a portion of the fluorinated surfactant to the adsorbent particles and (iii) separating the waste water and the adsorbent particles.

10 Claims, No Drawings

REMOVAL OF FLUORINATED SURFACTANTS FROM WASTE WATER

This application claims priority from European Patent Application Serial No. 04075384.0, filed Feb. 5, 2004.

1. Field of the Invention

The present invention relates to the removal and/or recovery of fluorinated surfactant from waste water, in particular from waste water that contains fluoropolymer particles.

2. Background of the Invention

Fluoropolymers, i.e. polymers having a fluorinated backbone, have been long known and have been used in a variety of applications because of several desirable properties such as heat resistance, chemical resistance, weatherability, UV-stability etc. The various fluoropolymers are for example described in "Modern Fluoropolymers", edited by John Scheirs, Wiley Science 1997. The fluoropolymers may have a partially fluorinated backbone, generally at least 40% by weight fluorinated, or a fully fluorinated backbone. Particular examples of fluoropolymers include polytetrafluoroethylene (PTFE), copolymers of tetrafluoroethylene (TFE) and hexafluoropropylene (HFP) (FEP polymers), perfluoroalkoxy copolymers (PFA), ethylene-tetrafluoroethylene (ETFE) copolymers, terpolymers of tetrafluoroethylene, hexafluoropropylene and vinylidene fluoride (THV) and polyvinylidene fluoride polymers (PVDF).

A frequently used method for producing fluoropolymers involves aqueous emulsion polymerization of one or more fluorinated monomers resulting in an aqueous dispersion of the fluoropolymer. The aqueous emulsion polymerization of fluorinated monomers generally involves the use of a fluorinated surfactant. Frequently used fluorinated surfactants include perfluorooctanoic acids and salts thereof, in particular ammonium perfluorooctanoic acid. Further fluorinated surfactants used include perfluoropolyether surfactants such as disclosed in EP 1059342, EP 712882, EP 752432, EP 816397, U.S. Pat. No. 6,025,307, U.S. Pat. No. 6,103,843 and U.S. Pat. No. 6,126,849. Still further surfactants that have been used are disclosed in U.S. Pat. No. 5,229,480, U.S. Pat. No. 5,763,552, U.S. Pat. No. 5,688,884, U.S. Pat. No. 5,700,859, U.S. Pat. No. 5,804,650, U.S. Pat. No. 5,895,799, WO 00/22002 and WO 00/71590.

Perfluorocarboxylic acids (PFCA) are the preferred emulsifiers for making fluorinated polymers, e.g. perfluorinated polymers like PTFE, FEP, PFA, perfluorinated elastomers, and others. Especially perfluorooctanoic acid (PFOA) in form of its salts (e.g. ammonium salt, APFO) is widely used. But, APFO and other fluorinated surfactants, in particular perfluorinated surfactants have raised environmental concerns. Another important aspect is the fact that these surfactants are expensive materials and any losses thereof from the production process should be minimized. Until now, these emulsifiers, especially APFO are indispensable because they do not display chain transfer properties. So PFOA or APFO respectively are just a prominent example for a whole class of fluorinated surfactants, in particular fluorinated surfactants with carboxylic acid groups.

The fluoropolymers may be used to coat substrates to provide desirable properties thereto such as for example chemical resistance, weatherability, water- and oil repellency etc. For example aqueous dispersions of fluoropolymer may be used to coat kitchen ware, to impregnate fabric or textile e.g. glass fabric, to coat paper or polymeric substrates. For sake of economy and convenience, the fluoropolymer dispersions will typically have between 35% by weight and 70% by weight of fluoropolymer solids, which is typically attained using an upconcentration process. Alternatively, for some applications, the fluoropolymers are provided in granular or powder form. To obtain fluoropolymer granulate or powder, the fluoropolymer is typically coagulated and the resulting coagulate may be washed with water one or more times to obtain a desired level of purity.

During the production of fluoropolymers to their final commercial form, waste water streams are created that contain fluorinated surfactant. For example, waste water streams may result from upconcentration of the dispersion, cleaning of the polymerization vessel and equipment, coagulation of the dispersion and washing to obtain fluoropolymer granulate or powder. Additionally, waste water containing fluorinated surfactant may result during application of the fluoropolymers. Frequently, the waste water streams not only contain fluorinated surfactant but also other components such as a small amount of fluoropolymer particles.

Several methods for the removal of PFCAs from aqueous media are known. For example, a method employing reverse osmosis is described in WO 02/139593. A combined process of extracting PFCA from aqueous solutions at low pH levels using chlorinated hydrocarbons and contacting the organic layer with alumina to recover the PFCA is described in EP 194692 and EP 194691. DE 2407834 discloses the use of silica gel to separate PFCAs from aqueous solutions.

Treatment of PFCA contaminated water can be done by applying reverse osmosis followed by an active carbon bed absorption including the regeneration thereof with ethanol as described by G. A. Bystrov et al, Plasticheskie Massy, (1990), (4), 75–8 (CA 113, 11571). As reported by the Russian Authors, the PFCA contaminated water (40–4000 mg of PFCA per liter) is purified by reverse osmosis in an initial step, resulting in water containing less than 20 mg per liter of PFCA. This level can be further reduced in an additional purification step using an active carbon bed. At break through of PFCA, the loaded active carbon bed is regenerated. Although several different methods were tried, the Soxhlet extraction with solvents, especially a ethanol-water mixture, showed the best results. But even in this case only 65% of the absorbed PFCA could be removed. The thus regenerated active carbon showed a decrease of activity in the range of 25–40%. Based on this result it is stated that the active carbon can be reused only 2–3 times before it has to be discarded.

While the aforementioned methods can be applied to remove fluorinated surfactants, in particular PFCAs from water, the methods cannot be readily applied to complicated industrial waste waters that contain further contaminants, in particular fluoropolymer particles. These particles may interfere with the removal process. In particular, the efficiency of adsorbent particles such as carbon black or silica gel is drastically reduced due to clogging of the adsorbent particles with the fluoropolymer particles.

Moreover, it will generally be desired to recover the fluorinated surfactant from the adsorbent particles such that the expensive fluorinated surfactant can be reused in a polymerization process and the adsorbent particles can be reused in a purification of waste water. While the efficiency of the adsorbent particles may decrease after re-generation, it would be desirable to regenerate the adsorbent particles such that they can be reused more frequently before they have to be discarded because of unacceptable low efficiency levels.

Accordingly, the use of adsorbent particles such as carbon black or silica gel for the recovery or removal of fluorinated surfactant from waste water containing fluoropolymer particles has not found practical applications. Instead, the use of an anion exchange resin to recover PFCAs from fluoropolymer particle containing waste water has been disclosed in WO 99/62858 and WO 99/62830. According to WO 99/62858, the fluoropolymer particles are removed from the waste water before contacting the waste water with the anion exchange resin. According to WO 99/62830, a non-ionic surfactant is added to the waste water before contacting the latter with the exchange resin.

It would now be desirable to find a further process for the removal and/or recovery of fluorinated surfactants, in particular carboxylic acid group containing fluorinated surfactants, from waste water containing fluoropolymer particles.

3. SUMMARY OF THE INVENTION

The present invention provides a method of removing a fluorinated surfactant from waste water comprising fluoropolymer particles. The method comprises (i) adding a non-fluorinated surfactant to the waste water (ii) contacting the thus obtained waste water with adsorbent particles to adsorb at least a portion of the fluorinated surfactant to the adsorbent particles and (iii) separating the waste water and the adsorbent particles.

By the term 'absorbent particles' in connection with the present invention is meant particles that are capable of physically adsorbing the fluorinated surfactant. However, the term 'adsorbent particles' is not intended to include ion exchange resins, which typically bind fluorinated surfactants having ionic groups as a result an ion exchange process notwithstanding the fact that the adsorption to the exchange resin may also occur by a physical adsorption process other than the ion exchange process.

Surprisingly, it has been found that notwithstanding the fact that the adsorbent particles typically also adsorb non-fluorinated surfactants, the fluorinated surfactant amount in the waste water containing fluoropolymer particles can be effectively reduced without risks of clogging of the adsorbent particles with the fluoropolymer particles.

4. DETAILED DESCRIPTION OF THE INVENTION

Any waste water resulting from the handling, use or production of fluoropolymers can be treated using the method of the present invention. Typically, such waste water will contain fluoropolymer particles in addition to some fluorinated surfactant. The quantity of fluoropolymer particles in the waste water is generally limited and is typically less than 5% by weight or less than 2% by weight based on the amount of water. A common amount of fluoropolymer particles in the waste water is less than 1% by weight, e.g. between 0.01 and 0.5% by weight. The fluoropolymer particles may have any shape although they are generally spherical and they may vary widely in size. Typically the fluoropolymer particles will have a diameter between 10 nm and 1000 nm, commonly between 30 and 500 nm.

The nature of the fluoropolymer particles is not critical and any fluoropolymer as well as mixtures of different fluoropolymers may be contained in the waste water. For example the fluoropolymer particles may be particles of non-melt processible fluoropolymers such as PTFE and modified PTFE or particles of melt-processible fluoropolymers including fluoroplastics and fluoroelastomers. Examples of melt-processible fluoropolymers include ETFE, FEP, PFA and THV polymers.

In addition to containing fluorinated surfactant and fluoropolymer particles, the waste water may contain other components such as residual ingredients from the polymerization process, e.g. salts, initiators, chain transfer agents etc.

In accordance with the present invention, a non-fluorinated surfactant should be added to the waste water before contacting the latter with the adsorbent particles. Although the non-fluorinated surfactant may get adsorbed to the adsorbent particles, it has been found that the use of the non-fluorinated surfactant nevertheless prevents or reduces the problem of clogging of the adsorbent particles with fluoropolymer particles. The amount of the non-fluorinated surfactant needed will typically depend on the nature of the adsorbent particles used as well as on the amount of fluoropolymer particles in the dispersion. The appropriate amount can be readily determined by one skilled in the art through routine experimentation. Generally, the amount of non-fluorinated surfactant will be between 1 and 1000 ppm based on the amount of fluoropolymer particles in the waste water. A convenient amount is between 5 and 500 ppm.

The non-fluorinated surfactant may be selected from anionic, amphoteric and non-ionic surfactants, with the latter being preferred. Examples of suitable non-ionic non-fluorinated surfactants include surfactants that contain one or more saturated or unsaturated aliphatic moieties linked to one or more non-ionic hydrophilic groups. The saturated or unsaturated aliphatic moieties may include linear, branched and/or cyclic structures and they can be linked to the non-ionic hydrophilic group through a functional group such as an ester, ether linkage, amide linkage etc. The non-ionic hydrophilic group generally comprises oxyalkylene groups in which the alkylene group has 2, 3 or 4 carbon atoms. For example, the non-ionic hydrophilic group may be a polyoxyethylene group, a polyoxypropylene group or a copolymer, including block-copolymers, comprising oxyethylene and oxypropylene groups.

Particular examples of non-ionic surfactants include polyoxyalkylene alkyl ether surfactants, polysorbates and alkoxylated acetylenic diols, preferably ethoxylated acetylenic diols. Commercially available ethoxylated acetylenic diols that may be used include those available under the SURFYNOL™ brand from Air Products, in particular SURFYNOL™ 465.

According to a particular embodiment in connection with the present invention, the non-ionic surfactant corresponds to the formula:

$$R^1\text{—O—}[CH_2CH_2O]_n\text{—}[R^2O]_m\text{—}R^3 \qquad (I)$$

wherein $R^1$ represents an aromatic or aliphatic hydrocarbon group having at least 8 carbon atoms, $R^2$ represents an alkylene having 3 carbon atoms, $R^3$ represents hydrogen or a $C_1$–$C_3$ alkyl group, n has a value of 0 to 40, m has a value of 0 to 40 and the sum of n+m being at least 2.

It will be understood that in the above formula (I), the units indexed by n and m may appear as blocks or they may be present in an alternating or random configuration.

Examples of non-ionic surfactants according to formula (I) above include alkylphenol oxy ethylates of the formula:

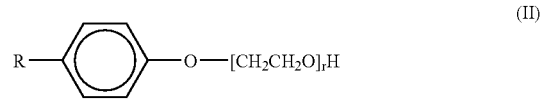

wherein R is an alkyl group of 4 to 20 carbon atoms and r represents a value of 4 to 20. Examples of surfactants according to formula (II) include ethoxylated p-isooctylphenol commercially available under the brand name TRITON™ such as for example TRITON™ X 100 wherein the number of ethoxy units is about 10 or TRITON™ X 114 wherein the number of ethoxy units is about 7 to 8.

Still further examples include those in which $R^1$ in the above formula (I) represents an alkyl group of 4 to 20 carbon atoms, m is 0 and $R^3$ is hydrogen. An example thereof includes isotridecanol ethoxylated with about 8 ethoxy groups and which is commercially available as GENAPOL® X 080 from Clariant GmbH. Non-ionic surfactants according to formula (I) in which the hydrophilic part comprises a block-copolymer of ethoxy groups and propoxy groups may be used as well. Such non-ionic surfactants are commercially available from Clariant GmbH under the trade designation GENAPOL® PF 40 and GENAPOL® PF 80.

Particular examples of anionic hydrocarbon surfactants for use in this invention include alkyl sulfonates such as lauryl sulfonate, alkyl sulfates such as lauryl sulfate, alkylarylsulfonates and alkylarylsulfates, fatty (carboxylic) acids and salts thereof such as lauric acids and salts thereof and phosphoric acid alkyl or alkylaryl esters and salts thereof. Commercially available anionic hydrocarbon surfactants that can be used include Polystep™ A16 (sodium dodecylbenzyl sulphonate) from Stepan Company, Hostapur™ SAS 30 (secondary alkyl sulphonate sodium salt), Emulsogen™ LS (sodium lauryl sulfate) and Emulsogen™ EPA 1954 (mixture of $C_{12}$ to $C_{14}$ sodium alkyl sulfates) available from Clariant GmbH and TRITON™ X-200 (sodium alkylsulfonate) available from Union Carbide. Preferred are anionic hydrocarbon surfactants having a sulfonate group.

The fluorinated surfactant contained in the waste water may be any fluorinated surfactant, i.e. the method of the present invention can be widely practiced to remove a variety of fluorinated surfactants, including mixtures thereof, from waste water. However, the method of the present invention is particularly suitable to remove and/or recover (per)fluorinated aliphatic acid surfactants or salts thereof. The method of the present invention can conveniently be used to remove fluorinated surfactants according to the following formula from waste water:

wherein Q represents hydrogen, Cl or F whereby Q may be present in terminal position or not; $R_f$ represents a linear or branched perfluorinated alkylene having 4 to 15 carbon atoms; Z represents $COO^-$, $M^a$ represents a cation including an alkali metal ion or an ammonium ion. Representative examples of fluorinated surfactants according to above formula (III) are perfluoroalkanoic acids and salts thereof such as perfluorooctanoic acid and its salts in particular ammonium salts.

The amount of fluorinated surfactant contained in the waste water is not particularly critical but is typically between 5 and 10 000 ppm, generally between 100 and 5000 ppm. Also, the waste water may contain a mixture of fluorinated surfactants although such will generally not be preferred.

In accordance with the method of the present invention, the waste water is contacted with adsorbent particles. Suitable adsorbent particles include carbon black, silica gel, clays and zeolites. Conveniently used are carbon black particles. The shape of the adsorbent particles is not particularly critical. For example, the adsorbent particles may have a plate shape, can be spherical, cylindrical or they can be rods. Also, adsorbent particles having a variety of different shapes may be used as a mixture. The size of the adsorbent particles is typically between 0.05 mm and 20 mm, generally between 0.1 and 10 mm. A practical range is between 0.5 and 5 mm. The adsorbent particles typically adsorb the fluorinated acid surfactant on their surface and it will thus generally be preferred to optimize the specific surface area of the particles, i.e. the amount of surface per unit of weight. Typically, the specific surface area of the adsorbent particles will be between 10 and 5000 $m^2/g$, generally between 100 and 3000 $m^2/g$ with a practical range being from 300 to 2000 $m^2/g$.

The amount of adsorbent particles used to remove fluorinated surfactant will generally depend on the nature of the adsorbent particles used as well as on the composition of the waste water, in particular the amount of fluorinated surfactant contained therein. Suitable amounts of the adsorbent particles may be determined by one skilled in the art through routine experimentation.

According to a preferred embodiment of the present invention, the adsorbent particles having adsorbed on them fluorinated surfactant are regenerated so that they can be reused multiple times to remove fluorinated surfactant from waste water, rather than having to be disposed of when they have been loaded to their maximum capacity.

A particularly useful way of regenerating the adsorbent particles that have been loaded with an acid group containing fluorinated surfactant such as for example perfluoroaliphatic acid surfactants or salts thereof or surfactants of the formula (III) above, involves mixing the absorbent particles loaded with the fluorinated surfactant with a regeneration fluid comprising an alcohol, optionally an acid and generally also water. In the thus obtained mixture to esterification of the acid group containing fluorinated surfactant with the alcohol is caused, generally by heating the mixture, so as to produce the ester derivative of the fluorinated acid surfactant. The order of addition of the components of the regeneration fluid is not critical although it will generally be preferred to first add the alcohol and then the optional acid to the adsorbent particles. It is of course also possible to prepare the regeneration fluid in advance by mixing the alcohol and optional acid and then mixing this as an integral fluid with the adsorbent particles. Preferably, the regeneration fluid will also contain water. The addition of an acid is not mandatory as the fluorinated acid surfactant may autocatalyse the esterification with the alcohol. Nevertheless, typically an acid is added in the regeneration fluid.

Suitable alcohols that may be used include in particular lower aliphatic alcohols having 1 to 5 carbon atoms such as methanol, ethanol and propanol. However aromatic alcohols may be used as well. Additionally, the alcohol may be added under the form of a precursor of the alcohol. Such a precursor should however form an alcohol under the conditions used to cause the esterification. Suitable precursors of the alcohol may include compound such as ketals that readily form a corresponding alcohol under the acidic conditions existing in the regeneration fluid or mixture thereof with the adsorbent particles. The optional acid when used with the regeneration fluid is preferably an inorganic acid but the use of organic acids is not excluded. Also, the acid is preferably a strong acid such as for example sulphuric acid, hydrochloric acid, phosphoric acid or nitric acid. The amount and nature of the acid used is typically such that a pH of less than 4, preferably not more than 3 and more preferably not more than 2 is attained in the mixture of regeneration fluid and adsorbent particles.

The regeneration process can be carried out at ambient pressure, positive pressure, and under reduced pressure. Typically, the process is carried out at a pressure between 0.1 and 2 atm, conveniently at ambient pressure, i.e. about 1 atm. The mixture will typically be heated to the boiling point of the mixture but lower temperatures can be used for the reaction as well. Typically, the process is carried out at a temperature of between 30 and 100° C.

The total amount of regeneration fluid and its composition is typically determined on basis of the amount of loaded adsorbent particles to be regenerated and the actual loading of the particles. Generally, the regeneration fluid should contain the alcohol in a stoichiometric amount or stoichiometric excess of the amount of fluorinated acid surfactant loaded on the adsorbent particles offered for regeneration. If this data is not available, one should generally apply a large excess of the regeneration liquid. This does not adversely affect the regeneration process but has the disadvantage that a non-optimal amount of regeneration liquid is used. The excess regeneration liquid can easily be drained from the regenerated adsorbent particles after the regeneration process is finished. The drained liquid can be weighed and analyzed to determine the actual amount and composition of the drained regeneration liquid. The composition and amount of the drained regeneration liquid can than be adjusted by adding appropriate amounts of its components so that the drained regeneration liquid may be re-used. Reuse of the regeneration liquid will create less waste, is environmentally friendly, and reduces the costs.

The volume ratio of regeneration fluid to adsorbent particles is preferably at least 2 although lower volume ratios may be used as well. However, lower volume ratios may cause damage to the adsorbent particles because of stresses generated at lower volume ratios. Higher volume ratios can be practiced but too large volume ratios will generally be uneconomical. Typically the volume ratio will be between 2 and 4.

The mixture containing the adsorbent particles and ester derivative of the fluorinated acid surfactant may be distilled. The distillate that forms contains the ester derivative. With a sufficient amount of water present in the distillate the ester derivative will generally easily separate out as a separate phase from the remainder of the distillate. The distillate will typically contain sufficient water if a substantial amount of water is contained in the regeneration fluid, e.g. at least 10% by weight. Alternatively, water may be added to distillate to cause separation. Typically, the ester derivative will form the lower phase. Thus, the ester derivative can be easily separated from the distillate and the remainder of the distillate may be re-introduced into the mixture being distilled. Such a regeneration process thus allows for convenient regeneration of the adsorbent particles with a minimal amount of regeneration fluid being needed.

Furthermore, it has been found that the regeneration process is highly effective and allows for re-use of the adsorbent particles multiple times, i.e. they can be regenerated several times before their efficiency drops below an uneconomical level at which point the adsorbent particles need to be disposed of. Furthermore, the process is highly efficient in removing fluorinated surfactant from the adsorbent particles such that even when the adsorbent particles need to be disposed of, because of their lost efficiency, the remaining levels of fluorinated surfactant in the adsorbent particles is very low. Also, despite the addition of the non-fluorinated surfactant to the waste water, some fluoropolymer particles contained therein may still adsorb to the adsorbent particles without however causing clogging of the adsorbent particles. It was found that the regeneration process is capable of releasing also these fluoropolymer particles completely or at least to a large extent from the adsorbent particles.

As will be appreciated by one skilled in the art, the regeneration process not only results in regenerated adsorbent particles but also the ester derivative of fluorinated acid surfactant. This ester derivative can be converted back into the corresponding fluorinated acid surfactant or salt thereof by hydrolysing the ester derivative as is known to those skilled in the art. The thus obtained fluorinated acid surfactant or salt thereof can then be reused in the polymerization of fluorinated monomers to make fluoropolymers.

The invention will now be further described with reference to the following examples without however the intention to limit the invention thereto.

EXAMPLES

Example 1

Two glass columns (diameter 4.5 cm) were loaded with dry active carbon (particle size 1.5 mm; available from Merck). The first column contained 201 g and the second column 205 g active carbon. The volume of each bed was ca. 400 ml. The columns were connected and water was pumped through until all gas was removed. Waste water obtained from several fluoropolymer emulsion polymerizations of a production plant was filtered to remove visible solids. 30 ppm Genapol™ X080 (non-ionic surfactant available from Clariant GmbH) were added to the filtered waste water that contained emulsified microparticles of fluoropolymers and 210–240 ppm of ammonium perfluorooctanoic acid (APFOA). This mixture was passed over the columns from the bottom to the top. The flow rate was initially adjusted to one bed volume per hour but was increased to 2.5 bed volumes per hour after a loading of 4.8 g of APFOA. No clogging of the active carbon bed could be seen during the loading process. At break through of perfluorooctanoic acid (PFOA) after the first column (PFOA level 45 ppm), 68.3 g APFO had adsorbed to the carbon bed. The columns were washed with 5 liter deionized water and the contents of the first column were transferred to a distillation apparatus consisting of a flask equipped with a mechanical stirrer, thermometer, vapor line and a condenser. The regeneration liquid, consisting of methanol, water and sulfuric acid (60/20/20 ratio) was added. The mixture was heated at a temperature between 70–85° C. to allow distillation. The condensed vapor separated in two liquid phases. The lower phase, consisting of methyl perfluorooctanoate was removed while the upper phase was sent back to the distillation flask. The distillation was finished as soon as no increase of the lower phase was observed. A total of 68.1 g methyl perfluorooctanoate was recovered (100%).

What is claimed is:

1. Method of removing a fluorinated surfactant from waste water comprising fluoropolymer particles, said method comprising (i) adding a non-fluorinated surfactant to said waste water (ii) contacting the thus obtained waste water with adsorbent particles to adsorb at least part of the fluorinated surfactant to said adsorbent particles and (iii) separating the waste water and the adsorbent particles.

2. Method according to claim 1 wherein said adsorbent particles comprise carbon black.

3. Method according to claim 1 wherein said non-fluorinated surfactant comprises a non-ionic surfactant.

4. Method according to claim 1 wherein said fluorinated surfactant comprises a fluorinated acid or salt thereof.

5. Method according to claim 4 wherein said fluorinated surfactant comprises a perfluoroaliphatic acid or salt thereof.

6. Method according to claim 1 wherein the amount of non-fluorinated surfactant is between 1 and 1000 ppm based on the amount of fluoropolymer particles in the waste water.

7. Method according to claim 1 further comprising regenerating the adsorbent particles.

8. Method according to claim 7 wherein said fluorinated surfactant comprises a perfluoroaliphatic acid or salt thereof and wherein the regenerating comprises mixing the adsorbent particles with an alcohol and an acid and heating the thus obtained mixture to cause esterification of said perfluoroaliphatic acid or salt thereof with said alcohol so as to produce an ester derivative of said perfluoroaliphatic acid.

9. Method according to claim 8 further comprising distilling the mixture, thereby forming a distillate containing said ester derivative, and separating said ester derivative from the distillate thereby yielding said ester derivative of said perfluoroaliphatic acid and a remainder of the distillate.

10. Method according to claim 9 wherein the remainder of the distillate is re-introduced in said mixture.

* * * * *

UNITED STATES PATENT AND TRADEMARK OFFICE
CERTIFICATE OF CORRECTION

PATENT NO. : 7,018,541 B2  Page 1 of 1
APPLICATION NO. : 11/034188
DATED : March 28, 2006
INVENTOR(S) : Hintzer, Klaus It is certified that error appears in the above-identified patent and that said Letters Patent is hereby corrected as shown below:

Title Page Col. 2 (Foreign Patent Documents) – Line 8 – Delete "12/2000" and insert -- 12/2003 --, therefor.

Title Page Col. 2 (Other Publications) – Line 1 – Delete "Sequoiz" and insert -- Sequoia --, therefor.

Title Page Col. 2 (Other Publications) – Line 5 – Delete "Database Chemabs" and insert -- DATABASE CHEMABS --, therefor.

Title Page Col. 2 (Other Publications) – Line 6 – Delete "Bustrov" and insert -- Bystrov --, therefor.

Title Page Col. 2 (Other Publications) – Line 10 – Delete "Coden:Plmsai" and insert -- CODEN:PLMSAI --, therefor.

Signed and Sealed this

Twenty-fifth Day of July, 2006

JON W. DUDAS
*Director of the United States Patent and Trademark Office*